United States Patent
Behi et al.

[11] Patent Number: 6,146,560
[45] Date of Patent: Nov. 14, 2000

[54] PROCESS FOR FORMING AN ARTICLE FROM RECYCLED CERAMIC MOLDING COMPOUND

[76] Inventors: Mohammad Behi, 16 Roosevelt Ave., Lake Hiawatha, N.J. 07034; Anthony Fanelli, 54 Edgefield Dr., Morris Plains, N.J. 07950; Joan V. Burlew, 106 Valley View Dr., Rockaway, N.J. 07866

[21] Appl. No.: 09/235,706

[22] Filed: Jan. 22, 1999

[51] Int. Cl.[7] .............................. B29B 17/00; B28B 1/24
[52] U.S. Cl. .................... 264/37.1; 264/37.29; 264/37.3; 264/645
[58] Field of Search .................. 264/28, 37.29, 264/37.3, 37.33, 37.1, 645

[56] References Cited

U.S. PATENT DOCUMENTS

| | | | |
|---|---|---|---|
| 3,631,131 | 12/1971 | Kopko | 264/37.29 |
| 4,734,237 | 3/1988 | Fanelli et al. | 264/122 |
| 5,304,329 | 4/1994 | Dickens, Jr. et al. | 264/37.29 |
| 5,458,833 | 10/1995 | Hammer et al. | 264/37.29 |
| 5,679,292 | 10/1997 | Nisimura | 264/37.29 |

OTHER PUBLICATIONS

H.H. Selby et al., "Agar", Industrial Gums, Academic Press, New York, NY, 2nd ed., 1973, Chapter, p. 29.

Patent Application Serial No. 08/869,053 (30–4310).

*Primary Examiner*—Christopher A. Fiorilla
*Attorney, Agent, or Firm*—Roger H. Criss

[57] ABSTRACT

Recycled, reground ceramic powder is mixed with a liquid carrier, a binder and processing additives to form a material useful for molding complex-shaped parts at relatively low pressures in conventional injection molding equipment.

13 Claims, 2 Drawing Sheets

PROCESS FOR FORMING AN ARTICLE FROM RECYCLED CERAMIC MOLDING COMPOUND

FIELD OF THE INVENTION

This invention relates to a process for shaping ceramic parts from powders and molding compositions therefor. More particularly, the invention is directed to molding compositions comprised solely of recycled, reground ceramic powder for forming various complex-shaped parts at relatively low pressures in conventional injection molding equipment. The "green" (unfired) parts exhibit excellent homogeneity and strength, and can be readily fired without experiencing the cracking, distortion and shrinkage problems associated with prior art sintered products. The finished parts are net or near-net shape, requiring little or no machining, and have excellent sintered properties.

BACKGROUND OF THE INVENTION

An objective of any forming method is to produce green parts which can be sintered to a shape that is reproducible to close dimensional tolerances and is free from defects. During green-forming and sintering, cracks, distortions and other defects can arise due to the shrinkage associated with the particle consolidation process. Thus, an object of a forming method is to produce homogeneous green bodies having adequate green strength.

Another objective of shape-forming methods is to produce articles having net shape, eliminating or minimizing the need for downstream operations, such as machining, to obtain final desired dimensions. Among the many shape-forming methods presently in use, dry pressing—which involves compaction of powder in a die—in particular requires machining and grinding to attain intricate shapes and close tolerances. Another method used to produce net shape parts, slip casting, while being capable of attaining close tolerances, is considered relatively slow for the manufacture of complex parts in high volume.

Injection molding, which is recognized as a premier forming method for complex ceramic shapes, overcomes the limitations of other forming methods. It is capable of rapidly producing close tolerance net shape, complex parts in high volume. In Fanelli et al, U.S. Pat. No. 4,734,237, and U.S. patent application Ser. No. 08/869,053, now abandoned the disclosures of both of which are incorporated herein by reference, processes for successfully molding net shape, complex parts in high volume are described.

Presently, net shape, complex ceramic parts are manufactured in injection molding equipment by formulating the powder feedstock material from new (unused) ceramic powders. For example, typical ceramic molding compounds are made from different combinations of Calcined Bone, China Clay (Kaolin) and China Stone (Cornish Stone) powders mixed in varying percentages, or different combinations of Bone Ash, Ball Clay, Feldspar, Kaolin and Silica powders mixed in varying percentages. Rejected fired ceramic parts are discarded and disposed of as landfill at considerable expense and time. The present invention obviates the need for such costly and time-consuming disposal of waste fired ceramic parts by providing useful compositions of reground ceramic powder mixed with other additives for making net shape, complex parts in conventional injection molding equipment.

The ceramic molding compositions according to the present invention provide readily moldable feedstock materials that obviate the need for high molding pressures and special debinding furnaces. The feedstock materials disclosed herein use water as the liquid carrier and can be molded at low machine pressures between about 150 to 1500 psi. The molded parts are dried before sintering by evaporation of the water, and thus the lengthy and complex debinding step typically required with polymer-based molding systems is eliminated.

BRIEF SUMMARY OF THE INVENTION

The present invention provides a process for shaping ceramic parts from powders including the steps of forming a mixture comprising recycled ceramic powder from a ceramic object, a dispersant, a pH control substance, a biocide, a gel-forming material chosen from the class of polysaccharides known as agaroids, a gel-forming material solvent and a carrier, the mixture being formed in a blender that provides shearing action thereto and the blender being heated to raise the temperature of the mixture to about 80° C. to 95° C.; supplying the mixture at a temperature above the gel point of the gel-forming material into an injection molding machine; and molding the mixture under conditions of temperature and pressure to produce a self-supporting article. After being allowed to dry, the article is then fired according to a sintering schedule for the material being used to obtain the desired properties for the finished article.

The invention further provides a useful composition of recycled ceramic powder for molding ceramic parts by injection molding, thus transforming fired ceramic waste material into a viable ceramic feedstock material. The molding compound comprises ground, recycled ceramic powder from a fired ceramic object, a dispersant such as ammonium polyacrylate, a pH control substance such as tetramethylammonium hydroxide, a biocide, a gel-forming material chosen from the class of polysaccharides known as agaroids, a gel-forming material solvent such as deionized water and a carrier, the mixture being formed in a blender that provides shearing action thereto and the blender being heated to raise the temperature of the mixture to about 80° C. to 95° C.

The invention also provides a method for producing a homogeneous molding compound comprising the steps of ball milling a mixture comprising recycled ceramic powder from a fired ceramic object, a dispersant, a pH control substance, a biocide, a gel-forming material solvent and a carrier to produce a slip with a small particle size between about 1–3 $\mu$m, blending the mixture with a gel-forming material chosen from the class of polysaccharides known as agaroids in a blender that provides shearing action to the mixture and heating the blender to raise the temperature of the mixture to about 80° C. to 95° C., cooling the mixture and shredding the mixture into a particulate format.

In the molding compounds according to the present invention water can conveniently serve the dual purpose of the gel-forming material solvent and the carrier.

BRIEF DESCRIPTION OF THE DRAWINGS

The invention will be more fully understood and further advantages will become apparent when reference is made to the following detailed description and the accompanying drawings in which.

DETAILED DESCRIPTION OF THE INVENTION

The invention provides a ceramic molding compound consisting of ground, recycled ceramic powder as the major ingredient. Heretofore, fired ceramic waste material from the molding process was disposed of because it could not be recycled to produce ceramic articles of acceptable quality. Imperfections such as cracks, pits and density variations in fired ceramic articles made recycling of fired ceramic waste material unfeasible. However, careful mixture of the proper additives formulated in a manner according to this invention has produced ceramic molding compounds that overcome these shortcomings.

Figure 1:
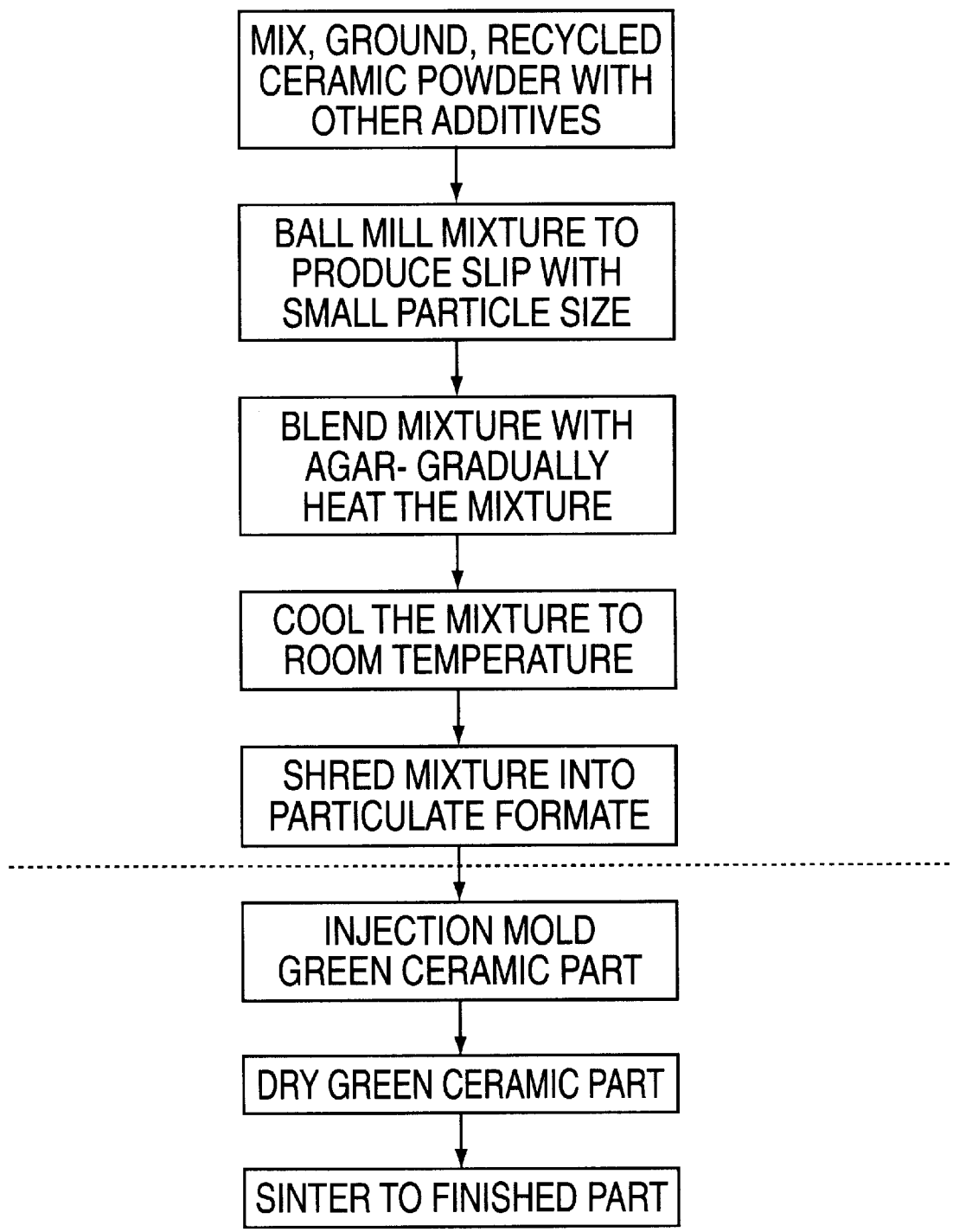
FIG. 1 is a schematic flow diagram of one embodiment of a method for producing a molding compound from recycled, reground ceramic powder and manufacturing ceramic parts from the recycled powder compound according to the present invention.

Bone china waste material (fired), which has been ground into powder in a conventional manner, is the basic ingredient of this invention. It should be understood that any type of available fired ceramic material could be used instead. Initially, the ground powder size is approximately 10–15 μm. As shown schematically in FIG. 1, the following additives are mixed with the ground ceramic powder: ammonium polyacrylate (approximately 0.1 to 1 wt %); tetramethylammonium hydroxide (approximately 0.2 to 2 wt %); a biocide, such as methyl-p-hydroxy benzoate or propyl-p-hydroxy benzoate (approximately 0.1 to 1.5 wt %); and deionized water (approximately 15 to 30 wt %). Although other formulation percentages were successfully produced and tested, the optimum composition was found to be approximately 74 wt % ceramic powder and 26 wt % water plus other additives. The mixture is then ball-milled for between about 18 to 24 hours in order to produce a slip with a particulate size of approximately 0.5 to 10 μm. The slip is transferred to a sigma mixer and compounded at room temperature with agar, a gel-forming material. Agar is from the class of polysaccharides known as agaroids, and is described in detail in Fanelli et al. The temperature of the mixture is gradually increased to about 93° C., and blending is continued for about one hour. The optimum temperature range for the mixture is between about 80° C. to 95° C. The mixture is allowed to cool to room temperature and then placed in a shredder and shredded into a particulate format.

Agaroids act as a binder that allows the fluidized mixture to set during the injection molding process and then be removed as a self-supporting structure. An agaroid has been defined as a gum resembling agar but not meeting all of the characteristics thereof [See H. H. Selby et al., "Agar", *Industrial Gums*, Academic Press, New York N.Y., $2^{nd}$ ed., 1973, Chapter 3, p. 29]. As used herein, however, agaroid not only refers to any gums resembling agar, but also to agar and derivatives thereof such as agarose. Agaroids are used in the present invention because they exhibit rapid gelation within a narrow temperature range, a factor that can dramatically increase the production rate of injection molded articles. The preferred gel-forming materials are those which are water soluble including agar, agarose or carrageenan, with the most preferred materials being agar, agarose and mixtures thereof The molding compound also includes a liquid carrier to facilitate transport of the feedstock mixture along the barrel of an injection molding machine to the mold within the machine. Water is a preferred liquid carrier because it ideally serves the dual purpose of being a solvent for the gel-forming binder and a liquid carrier for the solid constituents in the mixture. In addition, because of its low boiling point, water is easily removed from the molded article prior to and/or during firing. The amount of water used is chosen to provide the essential rheological characteristics for proper behavior of the feedstock mixture in the injection molding machine. The desirable amount of water is between about 10 to 30 wt % of the mixture, with amounts between about 15 to 20 wt % being preferred.

The molding compound may also contain a variety of additives which can serve a number of useful purposes. Additives that have been found to be very useful in the compositions according to the present invention include dispersants, pH control agents, biocides and gel-strength enhancing agents (e.g., metal borate compounds like calcium borate, magnesium borate and zinc borate). Biocides may be used to inhibit bacterial growth in the molding compounds, especially if they are to be stored for long periods of time.

It is well known that the use of dispersants and pH control agents can greatly improve the rheology and processibility of ceramic suspensions. In the present invention dispersants based on polyacrylate and polymethacrylate polymer backbones have been found useful in improving the processibility of the recycled ceramic powder molding compounds. The amount of dispersant in the compound is about 0.1 to 1.0 wt %, with amounts between about 0.4 wt % and 0.6 wt % being preferred. Similarly, tetramethylammonium hydroxide has been found useful for controlling the pH of the suspensions, the useful pH range being about 8 to 11, and preferably 9.3 to 9.9.

The molding compounds of the present invention combine the ceramic powder, liquid carrier, binder and processing additives in a readily moldable form. A preferred composition in terms of the constituents is approximately 74 wt % reground, recycled ceramic powder, 0.166 wt % dispersant, 0.175 wt % tetramethylammonium hydroxide, 0.035 wt % biocide and the remainder deionized water.

The invention also provides a method for combining all of the various constituents of the molding composition into a homogeneous mixture which will produce homogeneous molded green bodies that can be fired free of cracks and other defects. Reground, recycled ceramic powders are frequently highly agglomerated and require deagglomeration before they can be manufactured into useful ceramic articles, free of cracks, distortions and other defects. Of the various available methods ball milling has been found convenient and useful for producing the aqueous-based molding compounds disclosed herein. During the ball milling process, the powders are simultaneously deagglomerated and homogenized in the aqueous medium. The useful concentration range for ball milling the recycled ceramic powders is about 50 wt % to 85 wt %, with the preferable range being between about 65 wt % to 80 wt %.

Compounding of the ceramic suspension with the binder can be done in any number of efficient mixers, e.g., a sigma mixer or planetary-type mixer. The biocide may be blended into the composition at the compounding stage of the process, or optionally near the end of the ball milling cycle. During compounding, the mixture is heated in the range of about 80° C. to 95° C., and preferably about 90° C. to 93° C., for a period of about 15 to 120 minutes, and preferably about 30 to 60 minutes.

The molding compound must be in a suitable form to be introduced into an injection molding machine, and so the homogeneous mixture is allowed to cool below the gel point of the gel-forming agent (<37° C.). The mixture is then removed from the blender and shredded into a particulate format using a rotating cutter blade of a type typically used in food processing. The shredded format mixture can be fed directly into the hopper of an injection molding machine.

The shredded feedstock can be dried to a particular moisture content by exposing the material to the atmosphere causing evaporation to occur until the desired moisture level is obtained. Useful percent solids levels in the molding compositions are in the range of about 75 to 88 wt %, and preferably about 76 wt % to 80 wt %

The fired ceramic articles produced by the molding compounds of the present invention are relatively dense, net or near net shape articles. The physical properties of densified ceramic articles from one preferred molding compound containing approximately 74 wt % recycled ceramic powder were found to be excellent for all bone china applications, such as dinnerware, teacups and various decorative figures.

The following examples are presented to provide a more complete understanding of the invention. As used in the examples, the term "wt % solids" includes all residual material after removal of volatiles at approximately 150° C. Injection molding pressures quoted refer to machine hydraulic pressure. Unless specified otherwise, the ceramic firing temperature is about 1550° C. The specific techniques, conditions, materials, proportions and reported data set forth to illustrate the principles and practice of the invention are exemplary and should not be construed as limiting the scope of the invention.

Example 1

A batch of material was prepared consisting of the following constituents: 2800 g of recycled, reground ceramic powder obtained from fired, rejected bone china articles; 984 g of deionized water; and 0.3 wt % ammonium polyacrylate (40 wt % solution, Vanderbilt Laboratories). A sufficient amount of tetramethylammonium hydroxide was added to adjust the pH of the mixture to 9.8. The mixture was ball-milled for approximately 24 hours to produce a slip with a particulate size of approximately 1–3 $\mu$m. After ball-milling for approximately 23 hours, 0.67 wt % of methyl-p-hydroxy benzoate and 0.5 wt % of propyl-p-hydroxy benzoate were added to the slip, and the slip was transferred to a sigma mixer. During agitation of the slip in the sigma mixer, 3 wt % of a binder (Agar S-100, Frutarom Meer Corp.) was added to the batch and completely mixed at room temperature. Mixing continued for about one hour, and the batch temperature was gradually increased to 95° C. During the last 15 minutes of mixing, 0.3 wt % of calcium borate was incorporated into the batch. After the mixture was allowed to cool to room temperature, it was shredded into particulate using a food processor (Kitchen Aid KSM90). Prior to injection molding, the shredded feedstock was dried to a desired solids level by exposing a loose bed of the material to the atmosphere. Following injection molding of teacups from the feedstock material, the articles were dried at ambient conditions and fired at about 1200° C. for approximately 2 to 4 hours to produce the finished articles.

Example 2

This example represents a larger scale feedstock preparation than described in Example 1. A slip was prepared from 86 kg recycled, reground ceramic powder obtained from fired, rejected bone china articles; 29.63 kg of deionized water; 0.334 kg of ammonium polyacrylate; 0.023 kg of methyl-p-hydroxy benzoate; and 0.017 kg of propyl-p-hydroxy benzoate. The pH of the slip was adjusted to 9.48 using tetramethyl-ammonium hydroxide. The slip was ball-milled in a pebble mill for approximately 15 hours after which it was transferred to a planetary type blender where it was blended with 2.58 kg agar and 0.089 kg calcium borate while being agitated and heated. Mixing was continued for approximately 1 hour after the blender reached a final temperature of 95° C. After the material was allowed to cool to room temperature, it was shredded into particulate as described in Example 1.

Example 3

Figure 2:
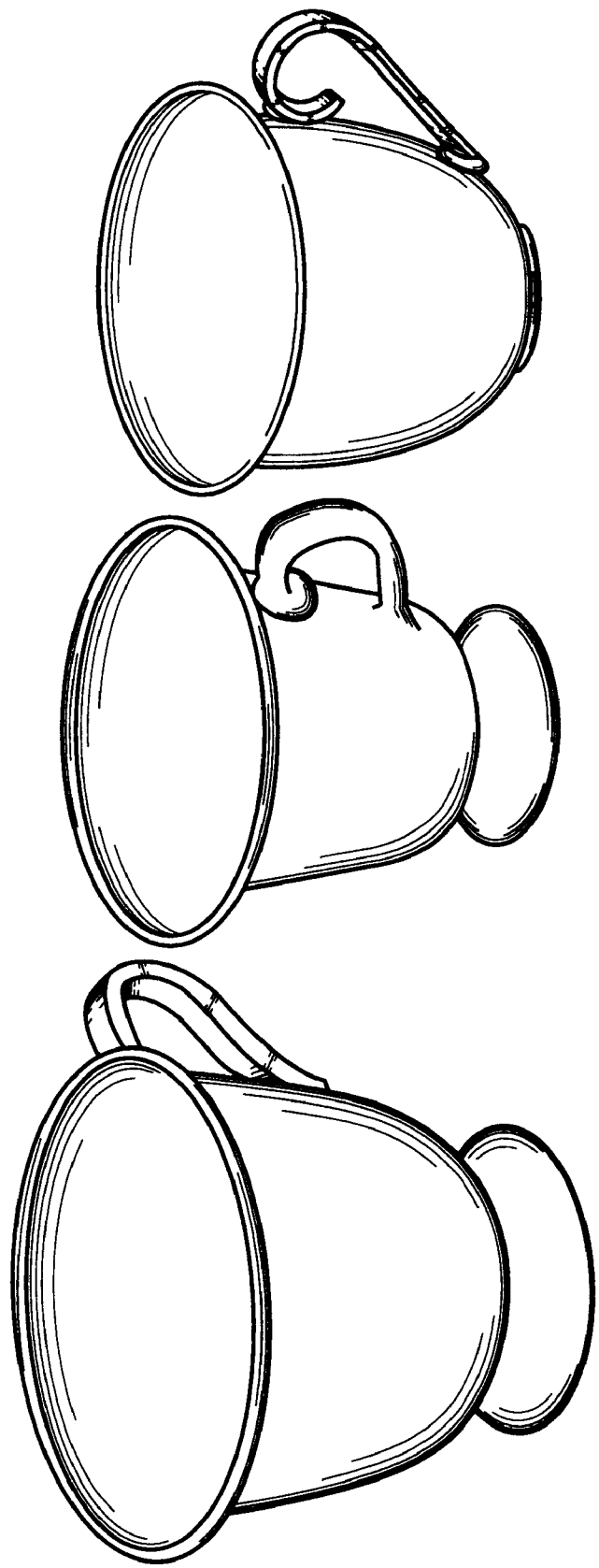
FIG. 2 is a photograph of examples of ceramic parts made from the recycled powder compound in an injection molding machine.

The feedstock material and process from Examples 1 and 2 were used to mold three different designs of teacups shown in FIG. 2 on an 85 ton Cincinnati injection molding machine. The material was molded both manually and in fully automatic mode using a robot to pick up the green part from the cavity. The molds used in the injection molding machine were made out of either epoxy or steel. The molding material used was about 78 wt % solid and was molded at approximately 300 psi injection pressure and approximately 20 psi holding pressure, with a packing time of about 3 seconds and a cooling time of about 50 to 70 seconds. Several other shape parts, such as simple square logo plates and three-hole insulators, were also molded using this process.

Having thus described the invention in rather full detail, it will be understood that various changes and modifications may suggest themselves to one skilled in the art, all falling within the invention as defined by the subjoined claims.

What is claimed is:

1. A process for forming an article comprising the steps of:
   a) formulating a molding compound from a mixture comprising
      i) recycled ceramic powder from a ceramic object,
      ii) a dispersant,
      iii) a pH control substance,
      iv) a biocide,
      v) a gel-forming material selected from the group of polysaccharides consisting of agaroids,
      vi) a gel-forming material solvent, and
      vii) a carrier,
   said mixture being formulated in a blender that provides shearing action thereto and the blender being heated to raise the temperature of the mixture to about 80 to 95° C. to form the molding compound;
   b) supplying the molding compound at a temperature above the gel point of the gel-forming material into an injection molding machine; and
   c) molding the compound under conditions of temperature and pressure to produce a self-supporting article.

2. The process of claim 1, wherein the recycled ceramic powder is ground from a fired ceramic object.

3. The process of claim 1, wherein the recycled ceramic powder is in the form of a slip having a particle size of approximately 0.5 to 10 $\mu$m.

4. The process of claim 3, wherein the ceramic powder slip constitutes approximately 70 to 80 wt % of the mixture.

5. The process of claim 4, wherein the ceramic powder slip constitutes approximately 74 wt % of the mixture.

6. The process of claim 1, wherein the dispersant is ammonium polyacrylate in a range of approximately 0.1 to 1 wt %.

7. The process of claim 1, wherein the pH control substance is tetramethylammonium hydroxide in a range of approximately 0.2 to 2 wt %.

8. The process of claim 5, wherein the pH of the mixture is between approximately 8 to 11.

9. The process of claim 1, wherein the biocide is selected from the group consisting of methyl-p-hydroxy benzoate and propyl-p-hydroxy benzoate in a range of approximately 0.1 to 1.5 wt %.

10. The process of claim 1, wherein the gel-forming material is selected from the group consisting of agar, agarose and mixtures thereof in a range of approximately 1 to 10 wt %.

11. The process of claim 1, wherein the gel-forming material solvent is deionized water in a range of approximately 15 to 30 wt %.

12. The process of claim 1, wherein the molding pressure is in a range of approximately 150 to 1500 psi.

13. The process of claim 1, wherein the molded parts are dried and sintered at about 1100° C. to 1300° C. for approximately 2–4 hours to produce the finished article.

* * * * *